(12) United States Patent
Huther Ebersohl et al.

(10) Patent No.: US 12,215,254 B2
(45) Date of Patent: Feb. 4, 2025

(54) HONEYCOMB CORE SPLICE ADHESIVE WITH IMPROVED FIRE RETARDANCY

(71) Applicant: Zephyros, Inc., Romeo, MI (US)

(72) Inventors: Estelle Huther Ebersohl, Molsheim (FR); Michel Awkal, Molsheim (FR)

(73) Assignee: Zephyros, Inc., Romeo, MI (US)

( * ) Notice: Subject to any disclaimer, the term of this patent is extended or adjusted under 35 U.S.C. 154(b) by 1156 days.

(21) Appl. No.: 16/979,031

(22) PCT Filed: Mar. 6, 2019

(86) PCT No.: PCT/EP2019/055573
§ 371 (c)(1),
(2) Date: Sep. 8, 2020

(87) PCT Pub. No.: WO2019/170747
PCT Pub. Date: Sep. 12, 2019

(65) Prior Publication Data
US 2021/0054239 A1    Feb. 25, 2021

(30) Foreign Application Priority Data

Mar. 8, 2018 (EP) ..................................... 18160786

(51) Int. Cl.
| | |
|---|---|
| C09J 5/08 | (2006.01) |
| C04B 38/00 | (2006.01) |
| C09J 5/06 | (2006.01) |
| C09J 11/04 | (2006.01) |
| C09J 11/08 | (2006.01) |
| C09J 163/00 | (2006.01) |

(52) U.S. Cl.
CPC ............. *C09J 5/08* (2013.01); *C04B 38/0019* (2013.01); *C09J 5/06* (2013.01); *C09J 11/04* (2013.01); *C09J 11/08* (2013.01); *C09J 163/00* (2013.01); *C09J 2463/00* (2013.01)

(58) Field of Classification Search
CPC ....... C09J 5/08; C09J 5/06; C09J 11/04; C09J 11/08; C09J 163/00; C09J 2463/00; C09J 9/00; C04B 38/0019; C04B 28/34; C08K 5/54; C08K 2003/2227; C08K 3/22; C08K 2003/323; C08G 59/4021
See application file for complete search history.

(56) References Cited

U.S. PATENT DOCUMENTS

2012/0177877 A1*   7/2012   Lebail ................... C08K 3/22
                                                          428/116

FOREIGN PATENT DOCUMENTS

| CN | 102459434 A | 5/2012 |
|---|---|---|
| CN | 107652930 A | 2/2018 |
| EP | 2818490 A1 | 12/2014 |
| JP | 2011093985 A | 5/2011 |

OTHER PUBLICATIONS

Chinese Notification of First Office Action dated Dec. 22, 2021, Application No. 201980030967.5.
European Communication Pursuant to Article 94(3) dated May 31, 2022, Application No. 19707842.1.
PCT Search Report & Written Opinion dated Apr. 24, 2019, Application No. PCT/EP2019/055573.
Canadian Office Action dated May 22, 2024, Application No. 3,093,194.

* cited by examiner

*Primary Examiner* — Daniel H Lee
(74) *Attorney, Agent, or Firm* — The Dobrusin Law Firm, PC

(57) ABSTRACT

The invention relates to a heat-activatable foamable honeycomb core splice adhesive having improved fire retardancy, particularly with respect to smoke toxicity and smoke opacity (smoke density).

20 Claims, No Drawings

HONEYCOMB CORE SPLICE ADHESIVE WITH IMPROVED FIRE RETARDANCY

FIELD OF THE INVENTION

The invention relates to a heat-activatable foamable honeycomb core splice adhesive having improved fire retardancy, particularly with respect to smoke toxicity and smoke opacity (smoke density). The heat-activatable foamable honeycomb core splice adhesive comprises a) a curable polymer; b) a curing agent for the curable polymer; c) a blowing agent; and d) a fire retardant comprising a combination of (i) an ammonium polyphosphate and (ii) a metal hydroxide. Preferably, the heat-activatable foamable core splice adhesive comprises a) an epoxy resin which is preferably liquid at room temperature; b) an epoxy curing agent; c) a blowing agent which is preferably a physical blowing agent or a combination of two different physical blowing agents; d) a fire retardant comprising a combination of (i) an ammonium polyphosphate and (ii) aluminum trihydroxide; and optionally e) an elastomer-containing adduct and f) para-aramid fibers.

BACKGROUND ART

When large or complex shaped honeycomb structures are desired, small honeycomb pieces can be spliced together with core splice adhesives. By means of such core splice adhesives, different core types, cell sizes and densities can all be connected with one another. Typical honeycomb core splice adhesives are provided as two-component pastes, one component materials or in form of foaming tapes. Both foaming tapes and nonfoaming tapes are available as well as paste type for buttering or trowel applications. The choice of which type of splice adhesive to use depends on the configuration of the part and the service environment.

When the complex shaped honeycomb structure is made of spliced pieces, the splices can be made first and then the part can be formed or carved. When the honeycomb panels that require spliced core are flat, the splice adhesive strip can be placed between the two core slices and cured at the same time as the facings are bonded to the core. A good procedure is to splice the honeycomb and bond the core to the edge close-out.

Various core splice adhesives are known from the prior art and several are commercially available (e.g. 3M AF 3070 FST, 3M AF 3028 FR, Henkel Hysol MA 562 SFR, JD Lincoln L-311).

US 2012/177877 relates to laminar structures comprising two facing panels separated by a honeycomb structure containing foamed elastomeric material in the cells, which provide a combination of sound insulation and fire retardancy in a compact light weight foam. The noise damping effect of the foamed elastomeric material that is contained in the cells is comparatively high, but its mechanical strength is comparatively low. US 2012/177877 does not relate to core splice adhesives and thus does not aim at providing a material that can be used e.g. for assembling honeycomb structures, e.g. for the bonding together of honeycomb structures and/or for edge finishing of honeycomb structures. Accordingly, US 2012/177877 does not provide a material having the mechanical strength that is desirable for a core splice adhesive. Further, the content of fire retardants within the material according to US 2012/177877 is comparatively high.

US 2017/218237 relates to curable compositions including room temperature liquid epoxy resin, epoxy curing agent, thermoplastic resin, and a physical blowing agent which are, in some embodiments, useful as core splice film adhesives and which are said to be in some embodiments fire retardant.

JP 2011 093985 relates to a thermoconductive pressure-sensitive adhesive composition (E1) comprising 100 pts. mass of at least one polymer (S1) selected from the group consisting of a rubber, an elastomer and a resin, at least 200 pts. mass and at most 900 pts. mass of an expanded graphite powder (B), at least 35 pts. mass and at most 250 pts. mass of a condensed phosphate ester (C), at least 15 pts. mass and at most 150 pts. mass of a phosphate salt (P) and at least 0.5 pt. mass and at most 200 pts. mass of a blowing agent (H), where the condensed phosphate ester (C) has a viscosity of at least 7,000 mPa s at 25° C. and is always liquid under atmospheric pressure within a temperature range of 15 to 100° C.

EP 2 818 490 relates to curable compositions comprising (i) at least one epoxy resin comprising at least one aromatic moiety or a moiety derivable by hydrogenating an aromatic moiety and wherein the epoxy resin does not contain an aromatic amine moiety, (ii) an epoxide hardener system comprising (a) a carboxylic acid anhydride, (b) a first amine having a melting point from about 30° C. to about 100° C. and containing at least one primary amine group; and (c) a second amine having a melting point of from about 50° C. to about 180° C. and having at least one primary amine group, wherein the first and second amines are selected such that they have a difference in melting points of at least 10° C. and wherein the first and second amines are contained in minor amounts by weight as compared to the carboxylic acid anhydride; (iii) a filler capable of reducing the density of the curable composition and, optionally, (iv) a fire-retardant system that includes a mixture of: (a) at least one compound selected from the group comprising alkaline earth metal hydroxides and aluminium group hydroxides, and (b) at least one phosphorous-containing material, furthermore, cured compositions obtainable by curing the above curable composition, the use of the curable composition for filling of voids in honeycomb structures and processes for filing voids in honeycomb structures.

However, only a few core splice adhesives are said to be flame retardant and none has a sufficiently low smoke opacity as well as a sufficiently low smoke toxicity.

Rigorous fire regulations are imposed on materials used in the transportation industries and in particular on materials used in aircraft. Reduced flammability, fire retardancy, reduction in smoke density, reduction in smoke toxicity, low heat release on burning are important for materials that are used in transportation vehicles. In particular, materials that are used inside the pressurized section of the fuselage of an aircraft should comply with the requirements of the Federal Aviation Authority (FAA) tests for fire, smoke and toxicity FAR Part 25.sctn.25.853 (a) and heat release FAR Part 25.sctn.25.853 (d).

The use of various flame retardants and combinations thereof in coatings is also known from the prior art.

Known flame retardants includes halogenated polymers, other halogenated materials, materials (e.g., polymers) including phosphorous, bromine, chlorine, oxide, combinations thereof or the like. Exemplary flame retardants include, without limitation, chloroalkyl phosphate, dimethyl methylphosphonate, bromine-phosphorus compounds, neopentylbromide polyether, brominated polyether, antimony oxide, calcium metaborate, chlorinated paraffin, brominated toluene, hexabromobenzene, antimony trioxide, graphite (e.g., expandable graphite), combinations thereof or the like.

The properties of the honeycomb core splice adhesives according to the prior art are not satisfactory in every respect and there is a demand for improved honeycomb core splice adhesives.

US 2004/0002559 provides are flame retardant coating compositions and articles coated therewith, which compositions comprise (A) a coating and (B) an effective flame retarding amount of a mixture of (i) at least one compound selected from the group consisting of the (a) sterically hindered nitroxyl stabilizers, (b) sterically hindered hydroxylamine stabilizers and (c) sterically hindered alkoxyamine stabilizers and (ii) at least one conventional flame retardant selected from the group consisting of (d) organohalogen flame retardants, (e) organophosphorus flame retardants, (f) isocyanurate flame retardants and (g) melamine based flame retardants. The coated articles are for example iron, steel, stainless steel, aluminum and other non-ferrous metals, wood, plywood, paper, cardboard, chip board, particle board, plastics, thermoplastics, epoxies, neoprene, rubber, composites, fiberglass reinforced composites, polyesters, polymeric foam, masonry, fabric or textiles, wire and cable constructions and circuit boards.

US 2012/0153242 relates to foamable elastomeric formulations that are suitable for producing polymer foams with insulation and vibration damping properties and the fire retardancy required for internal aircraft panels.

US 2012/0177877 discloses laminar structures comprising two facing panels separated by a honeycomb structure containing foamed elastomeric material in the cells that provide a combination of sound insulation and fire retardancy in a compact light weight foam which can be produced using traditional manufacturing techniques.

It is an object of the invention to provide honeycomb core splice adhesives that have advantages compared to the honeycomb core splice adhesives of the prior art particularly with respect to fire retardancy. The honeycomb core splice adhesives should preferably have improved smoke toxicities and improved smoke opacities (smoke densities).

This object has been achieved by the subject-matter of the patent claims.

It has been surprisingly found that specific combinations of compounds provide fire retardants providing the honeycomb core splice adhesives with improved fire retardancy, especially with respect to smoke toxicity and smoke opacity (smoke density).

A first aspect of the invention relates to a heat-activatable foamable honeycomb core splice adhesive comprising
  a) at least one curable polymer;
  b) at least one curing agent for the curable polymer;
  c) at least one blowing agent; and
  d) a fire retardant (fire retardant/smoke suppressor) comprising a combination of
    (i) at least one ammonium polyphosphate and
    (ii) at least one metal hydroxide.

The heat-activatable foamable honeycomb core splice adhesive according to the invention is particularly useful to assemble honeycomb structures, especially for the bonding together of honeycomb structures and for edge finishing of honeycomb structures.

The core splice adhesive according to the invention foams and cures under the application of heat. Preferably, the core splice adhesive according to the invention is flexible and can be readily processed prior to curing and foaming and forms a rigid foam upon foaming and curing.

The core splice adhesive according to the invention is preferably selected so as to be heat-activatable at a desired temperature. As used herein, heat-activatable means that upon exposure to a suitable activation temperature, the core splice adhesive cures, expands, and foams and optionally also softens (e.g., melts).

In a preferred embodiment, the core splice adhesive has a post-cure glass transition temperature that is greater than any temperatures to which the core splice adhesive may be exposed while in its intended environment of use (e.g., in an airplane or automotive vehicle). Exemplary post-cure glass transition temperatures may be at least about 80° C. and more preferably at least about 100° C. Other desired characteristics of the core splice adhesive might include good adhesion retention and degradation resistance particularly in adverse environments such as highly variable temperature environments, high dynamic activity environments, combinations thereof or the like.

The core splice adhesive may be a thermoplastic, a thermoset or a blend thereof. According to one embodiment, the core splice adhesive is as an epoxy-containing material, an ethylene-containing polymer, an acetate or acrylate containing polymer, or a mixture thereof, which when compounded with the curing agent and the blowing agent, preferably expands, cures or both in a reliable and predictable manner upon the application of heat. Thus, according to one preferred embodiment, an exemplary core splice adhesive may be a heat-activatable epoxy-based resin having foamable characteristics. Generally, it is contemplated that, particularly for higher expansion core splice adhesives, it may include or be based upon an elastomer (e.g., a rubber), an acetate, an acrylate or combinations thereof.

From a chemical standpoint, the core splice adhesive is usually initially processed as a thermoplastic material before curing. After curing, the core splice adhesive preferably becomes a thermoset material that is fixed and incapable of any substantial flow. It is also contemplated that the core splice adhesive may comprise fibers such as glass fibers, carbon fibers or polyamid fibers such as aramid fibers.

The core splice adhesive is heat-activatable. Preferably, heat-activation takes place during applications where in the course of a manufacturing processing the honeycomb panel is anyway exposed to elevated temperatures for other reasons, e.g. in order to adhere the face sheets to the honeycomb core.

Therefore, an important consideration involved with the design and formulation of the core splice adhesive can be the temperature at which the material activates, cures or both (activation temperature). In most applications, it is undesirable for the core splice adhesive to activate at room temperature or the ambient temperature in a production or assembly environment. Preferably, it is desirable for the core splice adhesive to activate at higher processing temperatures.

The activation temperatures for curing and foaming may differ from one another, e.g. the activation to cure temperature may differ from the activation to foam temperature (activation to release a gas temperature). Further, one and the same process may have more than one activation temperature. For example, when the core splice adhesive contains two different physical blowing agents having different activation to foam temperatures, a first foaming process may take place at a first activation to foam temperature, whereas a second foaming process may take place at a second activation to foam temperature. Likewise, when the core splice adhesive contains two different curing agents having different activation to cure temperatures, a first curing process may take place at a first activation to cure temperature, whereas a second curing process may take place at a second activation to cure temperature.

Unless expressly stated otherwise, the term "activation temperature" refers to any activation temperature, i.e. to the activation to cure temperature(s) as well as to the activation to foam temperature(s).

The activation temperature is preferably at least about 50° C., more preferably at least about 70° C., still more preferably at least about 90° C. and even more preferably at least about 110° C., and preferably not more than about 310° C., more preferably not more than about 290° C., still more preferably not more than about 270° C. and even more preferably not more than about 250° C.

As already mentioned above, the core splice adhesive may have different activation temperatures. Preferably, said different activation temperatures independently of one another are within the ranges specified above. Preferably any of said different activation temperatures lies within a relative temperature range of preferably not more than about 70° C., more preferably not more than about 60° C., still more preferably not more than about 50° C., and even more preferably not more than about 40° C. Thus, for example, when the relative temperature range is not more than 70° C. and the highest absolute activation temperature of the core splice adhesive is e.g. 183° C., the lowest absolute activation temperature of the core splice adhesive is at least 113° C. (183° C.–70° C.).

Exposure to activation temperature(s) preferably occurs for a period of time that is at least about 10 minutes or less, more preferably at least about 20 minutes and even more preferably at least about 30 minutes, and preferably not more than about 300 minutes or greater, more preferably not more than about 180 minutes and even more preferably not more than about 90 minutes.

In a preferred embodiment, the heat-activatable foamable honeycomb core splice adhesive is heat activated in a panel press. The panel structure containing the core splice adhesive is fed to a panel press where it experiences temperatures that are preferably at least about 65° C., more preferably at least about 95° C. and even more preferably at least about 130° C., and preferably not more than about 290° C., more preferably not more than about 215° C. and even more preferably not ore than about 180° C., which cause the core splice adhesive to foam and cure. While in the press, a pressure is preferably applied to the panel structure urging the components of the panel structure toward each other.

Although the core splice adhesive is heat-activatable, it may be otherwise additionally activated by other stimuli to cure, expand, bond, combinations thereof or the like. Without limitation, such core splice adhesive may be activated by alternative stimuli such as, pressure, moisture, chemicals, ultraviolet radiation, electron beam, induction, electromagnetic radiation or by other ambient conditions. As particular examples, the core splice adhesive may be a two-component core splice adhesive that expands, cures, adheres or a combination thereof upon adding one component to the other. Examples of first component/second component include epoxy/amine materials and epoxy/acid materials.

It is additionally contemplated that other additional or alternative techniques may be used to process the panel structure. Such techniques can include vacuum forming and baking, autoclaving and pressure, others or combinations thereof. Such techniques can assist in forming panels with contours. Heats and time period for these techniques can be the same as those discussing above or may be different depending upon the activatable material used.

In one particular embodiment, one singular mass or multiple masses in the form of strips of core splice adhesive are pressed against the honeycomb and/or the one or more panels such that strips attach to the components because of adhesive properties of the core splice adhesive, deformation of the activatable material upon pressing or both. It is also contemplated that the strips of core splice adhesive may be contoured (e.g., bent) about contours of the one or more panels and or the honeycomb (particularly the outer edge of the honeycomb) during pressing or manual application. In such an embodiment, it is preferably desirable for the strip(s) of core splice adhesive to be sufficiently flexible to allow bending of the strip(s) from a first straight or linear condition or shape to a second angled or arced condition or shape (e.g., such that one portion of the strip is at an angle (e.g., a right angle) relative to another portion) without significant tearing or cracking of the strip (e.g., tearing or cracking that destroys the continuity of the strip or pull one part of the strip away from another part).

For allowing application of the core splice adhesive according to the aforementioned protocols, particularly the manual applications, although the automated and applicator techniques may be used as well, it is preferably desirable for the core splice adhesive to exhibit certain desirable properties. As suggested, it is generally desirable for the core splice adhesive, prior to activation, to be generally flexible or ductile. After activation of the core splice adhesive, it is preferable, although not required, for the expanded (i.e. foamed) core splice adhesive (e.g., foam) to have relatively high strength.

Prior to heat activation, the core splice adhesive according to the invention is preferably tacky in accordance with ASTM D 297. Preferably, the maximum tack force measured in accordance with ASTM D 297 is at least about 2.5 Newton, more preferably at least about 5 Newton, still more preferably at least about 7.5 Newton, yet more preferably at least about 10 Newton, and even more preferably at least about 12.5 Newton. Preferably, the maximum tack force is within the range of from about 14 to about 24 Newton.

Prior to heat activation, the core splice adhesive according to the invention has preferably at a thickness within the range of from about 1.2 mm to about 1.4 mm a weight per unit area within the range of from about 1500 $g/m^2$ to about 2000 $g/m^2$, more preferably from about 1550 $g/m^2$ to about 1950 $g/m^2$, still more preferably from about 1600 $g/m^2$ to about 1900 $g/m^2$, and most preferably from about 1650 $g/m^2$ to about 1850 $g/m^2$.

Prior to heat activation, the core splice adhesive according to the invention has preferably a density within the range of from about 1.15 $g/cm^3$ to about 1.54 $g/cm^3$, more preferably from about 1.19 $g/cm^3$ to about 1.50 $g/cm^3$, still more preferably from about 1.23 $g/cm^3$ to about 1.46 $g/cm^3$, and most preferably from about 1.27 $g/cm^3$ to about 1.42 $g/cm^3$.

In a preferred embodiment, after heat activation, the core splice adhesive according to the invention has preferably a density within the range of from about 0.31 $g/cm^3$ to about 0.65 $g/cm^3$, more preferably from about 0.34 $g/cm^3$ to about 0.52 $g/cm^3$, still more preferably from about 0.37 $g/cm^3$ to about 0.49 $g/cm^3$, and most preferably from about 0.40 $g/cm^3$ to about 0.46 $g/cm^3$.

In another preferred embodiment, after heat activation, the core splice adhesive according to the invention has preferably a density within the range of from about 0.70 $g/cm^3$ to about 0.99 $g/cm^3$, more preferably from about 0.78 $g/cm^3$ to about 0.96 $g/cm^3$, still more preferably from about 0.81 $g/cm^3$ to about 0.93 $g/cm^3$, and most preferably from about 0.84 $g/cm^3$ to about 0.90 $g/cm^3$.

Prior to heat activation, the core splice adhesive according to the invention is storage stable under ambient conditions (e.g. 23° C. and 50% r.h.). Thus, the core splice adhesive according to the invention may be stored under ambient conditions without being activated prematurely. Preferably, the core splice adhesive according to the invention is storage stable under ambient conditions for at least about one week, more preferably more than about one week, still more preferably at least about one month, yet more preferably at least about two months and in particular at least about three months.

It is contemplated that the core splice adhesive according to the invention may be stored at low temperatures (e.g. 4° C. or −18° C.) in order to even further improve storage stability.

During activation, the core splice adhesive according to the invention preferably has a volatile content of not more than about 4.0%, more preferably not more than about 3.5%, still more preferably not more than about 3.0%, yet more preferably not more than about 2.5%, even more preferably not more than about 2.0%, most preferably not more than about 1.5%, and in particular not more than about 1.0%, in each case when being tested in accordance with EN 2667-3.

During activation, the core splice adhesive according to the invention preferably has a vertical slump of not more than about 1.5 mm, more preferably not more than about 1.0 mm, still more preferably not more than about 0.9 mm, yet more preferably not more than about 0.8 mm, even more preferably not more than about 0.7 mm, most preferably not more than about 0.6 mm, and in particular not more than about 0.5 mm, in each case when being tested in accordance with EN 2667-4.

During activation, the core splice adhesive according to the invention preferably has an exothermicity within the range of from about 45° C. to about 75° C., more preferably from about 48° C. to about 72° C., still more preferably from about 50° C. to about 70° C., yet more preferably from about 52° C. to about 68° C., even more preferably from about 54° C. to about 66° C., most preferably from about 56° C. to about 64° C., and in particular from about 58° C. to about 62° C., in each case when being tested in accordance with EN 2667-5.

At a temperature of −55° C., the activated core splice adhesive preferably has a compressive strength within the range from about 6 MPa to about 22 MPa, more preferably from about 8 MPa to about 20 MPa, still more preferably from about 10 MPa to about 18 MPa, and most preferably from about 12 MPa to about 16 MPa, in each case when being tested in accordance with ASTM D 695, preferably at a sample density of 0.43 g/cm$^3$.

At a temperature of 23° C., the activated core splice adhesive preferably has a compressive strength within the range from about 3 MPa to about 11 MPa, more preferably from about 4 MPa to about 10 MPa, still more preferably from about 5 MPa to about 9 MPa, and most preferably from about 6 MPa to about 8 MPa, in each case when being tested in accordance with ASTM D 695, preferably at a sample density of 0.43 g/cm$^3$.

At a temperature of 85° C., the activated core splice adhesive preferably has a compressive strength within the range from about 1 MPa to about 9 MPa, more preferably from about 2 MPa to about 8 MPa, still more preferably from about 3 MPa to about 7 MPa, and most preferably from about 4 MPa to about 6 MPa, in each case when being tested in accordance with ASTM D 695, preferably at a sample density of 0.43 g/cm$^3$.

At a temperature of −55° C., the activated core splice adhesive preferably has a compressive modulus within the range from about 50 MPa to about 90 MPa, more preferably from about 55 MPa to about 85 MPa, still more preferably from about 60 MPa to about 80 MPa, and most preferably from about 65 MPa to about 75 MPa, in each case when being tested in accordance with ASTM D 695, preferably at a sample density of 0.43 g/cm$^3$.

At a temperature of 23° C., the activated core splice adhesive preferably has a compressive modulus within the range from about 230 MPa to about 390 MPa, more preferably from about 250 MPa to about 370 MPa, still more preferably from about 270 MPa to about 350 MPa, and most preferably from about 290 MPa to about 330 MPa, in each case when being tested in accordance with ASTM D 695, preferably at a sample density of 0.43 g/cm$^3$.

At a temperature of 85° C., the activated core splice adhesive preferably has a compressive modulus within the range from about 200 MPa to about 360 MPa, more preferably from about 220 MPa to about 340 MPa, still more preferably from about 240 MPa to about 320 MPa, and most preferably from about 260 MPa to about 300 MPa, in each case when being tested in accordance with ASTM D 695, preferably at a sample density of 0.43 g/cm$^3$.

At a temperature of −55° C., the activated core splice adhesive preferably has a compressive tube shear strength within the range from about 5 MPa to about 21 MPa, more preferably from about 7 MPa to about 19 MPa, still more preferably from about 9 MPa to about 17 MPa, and most preferably from about 11 MPa to about 15 MPa, in each case when being tested in accordance with EN 2667-2, preferably at a sample density of 0.87 g/cm$^3$.

At a temperature of 23° C., the activated core splice adhesive preferably has a compressive tube shear strength within the range from about 4 MPa to about 12 MPa, more preferably from about 5 MPa to about 11 MPa, still more preferably from about 6 MPa to about 10 MPa, and most preferably from about 7 MPa to about 9 MPa, in each case when being tested in accordance with EN 2667-2, preferably at a sample density of 0.87 g/cm$^3$.

At a temperature of 85° C., the activated core splice adhesive preferably has a compressive tube shear strength within the range from about 3 MPa to about 11 MPa, more preferably from about 4 MPa to about 10 MPa, still more preferably from about 5 MPa to about 9 MPa, and most preferably from about 6 MPa to about 8 MPa, in each case when being tested in accordance with EN 2667-2, preferably at a sample density of 0.87 g/cm$^3$.

Of course, lower compressive moduli, lower compressive strengths, and lower compressive tube shear strengths may also be employed for the present invention, unless otherwise stated.

The core splice adhesive according to the invention exhibits excellent fire retardancy, especially flame retardancy, smoke density (smoke opacity) and smoke toxicity.

Preferably, at a sample thickness of 6.35 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the core splice adhesive according to the invention exhibits in the vertical burn test, 12 seconds in accordance with FAR 25 Appendix F Part 1 (b.iv)/AITM 2.0002 B, a maximum burn length of not more than about 160 mm, more preferably not more than about 140 mm, still more preferably not more than about 120 mm, and most preferably not more than about 100 mm.

Preferably, at a sample thickness of 6.35 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the core splice adhesive according to the invention exhibits in the vertical burn test, 12 seconds in accordance with FAR 25 Appendix F Part 1 (b.iv)/AITM 2.0002 B, an after flame time of not more than about 6 seconds, more preferably not more than about 4 seconds, still more preferably not more than about 2 seconds, and most preferably about 0 seconds.

Preferably, at a sample thickness of 6.35 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the core splice adhesive according to the invention exhibits in the vertical burn test, 12 seconds in accordance with FAR 25 Appendix F Part 1 (b.iv)/AITM 2.0002 B, no drips formation.

Preferably, at a sample thickness of 6.35 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the core splice adhesive according to the invention exhibits in the vertical burn test, 60 seconds in accordance with FAR 25 Appendix F Part 1 (b.iv)/AITM 2.0002 A, a maximum burn length of not more than about 150 mm, more preferably not more than about 140 mm, still more preferably not more than about 130 mm, and most preferably not more than about 125 mm.

Preferably, at a sample thickness of 6.35 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the core splice adhesive according to the invention exhibits in the vertical burn test, 60 seconds in accordance with FAR 25 Appendix F Part 1 (b.iv)/AITM 2.0002 A, an after flame time of not more than about 6 seconds, more preferably not more than about 4 seconds, still more preferably not more than about 2 seconds, and most preferably about 0 seconds.

Preferably, at a sample thickness of 6.35 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the core splice adhesive according to the invention exhibits in the vertical burn test, 60 seconds in accordance with FAR 25 Appendix F Part 1 (b.iv)/AITM 2.0002 A, no drips formation.

Preferably, at a sample thickness of 6.35 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the core splice adhesive according to the invention exhibits in accordance with JAR/FAR 25.853 AITM 2.0007 A flaming modes, a smoke density of not more than about 200, more preferably not more than about 180, still more preferably not more than about 160, and most preferably not more than about 140.

Preferably, at a sample thickness of 6.35 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., the core splice adhesive according to the invention exhibits a smoke toxicity in accordance with AITM 3.0005 with respect to HF: preferably not more than about 60 ppm, more preferably not more than about 40 ppm, still more preferably not more than about 20 ppm, and most preferably about 0 ppm; and/or HCl: preferably not more than about 60 ppm, more preferably not more than about 40 ppm, still more preferably not more than about 20 ppm, and most preferably about 0 ppm; and/or NOx: preferably not more than about 100 ppm, more preferably not more than about 90 ppm, still more preferably not more than about 80 ppm, and most preferably not more than about 70 ppm; and/or $SO_2$: preferably not more than about 70 ppm, more preferably not more than about 50 ppm, still more preferably not more than about 30 ppm, and most preferably not more than about 10 ppm; and/or HCN: preferably not more than about 90 ppm, more preferably not more than about 70 ppm, still more preferably not more than about 50 ppm, and most preferably not more than about 30 ppm.

The core splice adhesive according to the invention is foamable upon heat-activation at the activation temperature and the activation to foam temperature(s), respectively. Preferably, upon heat activation, the core splice adhesive preferably volumetrically expands and thus increases its volume by at least about 10%, more preferably at least about 30% and even more preferably at least about 50% or more, relative to the volume of the core splice adhesive prior to expansion.

The expansion ratio is preferably determined in accordance with EN 2667-3. The expansion ratio can be adapted to the desired curing conditions and the desired storage conditions by altering the type and the amount of the blowing agent(s). Several curing cycles and several storage conditions may also be taken into account.

In preferred embodiments, under curing conditions comprising (i) an initial dynamic heating period from room temperature to a temperature of 125° C. at a heating rate of 3° C./min and (ii) a subsequent constant heating period of 55 minutes at a temperature of 125° C., the activated core splice adhesive according to the invention preferably has a vertical expansion within the range from about 120% to about 180%, more preferably from about 125% to about 175%, still more preferably from about 130% to about 170%, and most preferably from about 135% to about 165%, in each case when being tested in accordance with EN 2667-3.

In preferred embodiments, under curing conditions comprising (i) an initial dynamic heating period from room temperature to a temperature of 140° C. at a heating rate of 3° C./min and (ii) a subsequent constant heating period of 55 minutes at a temperature of 140° C., the activated core splice adhesive according to the invention preferably has a vertical expansion within the range from about 160% to about 220%, more preferably from about 165% to about 215%, still more preferably from about 170% to about 210%, and most preferably from about 175% to about 205%, in each case when being tested in accordance with EN 2667-3.

In preferred embodiments, under curing conditions comprising (i) a constant heating period of 30 minutes at a temperature of 80° C., (ii) a subsequent dynamic heating period from 80° C. to a temperature of 125° C. at a heating rate of 3° C./min, and (iii) a subsequent constant heating period of 55 minutes at a temperature of 125° C., the activated core splice adhesive according to the invention preferably has a vertical expansion within the range from about 120% to about 170%, more preferably from about 125% to about 165%, still more preferably from about 130% to about 160%, and most preferably from about 135% to about 155%, in each case when being tested in accordance with EN 2667-3.

In preferred embodiments, under curing conditions comprising (i) a constant heating period of 30 minutes at a temperature of 100° C., (ii) a subsequent dynamic heating period from 100° C. to a temperature of 125° C. at a heating rate of 3° C./min, and (iii) a subsequent constant heating period of 55 minutes at a temperature of 125° C., the activated core splice adhesive according to the invention preferably has a vertical expansion within the range from about 120% to about 170%, more preferably from about 125% to about 165%, still more preferably from about 130% to about 160%, and most preferably from about 135% to about 155%, in each case when being tested in accordance with EN 2667-3.

In preferred embodiments, under curing conditions comprising (i) a constant heating period of 30 minutes at a temperature of 80° C., (ii) a subsequent dynamic heating period from 80° C. to a temperature of 140° C. at a heating rate of 3° C./min, and (iii) a subsequent constant heating period of 55 minutes at a temperature of 140° C., the activated core splice adhesive according to the invention preferably has a vertical expansion within the range from about 160% to about 220%, more preferably from about 165% to about 215%, still more preferably from about 170% to about 210%, and most preferably from about 175% to about 205%, in each case when being tested in accordance with EN 2667-3.

In preferred embodiments, under curing conditions comprising (i) a constant heating period of 30 minutes at a temperature of 100° C., (ii) a subsequent dynamic heating period from 100° C. to a temperature of 140° C. at a heating rate of 3° C./min, and (iii) a subsequent constant heating period of 55 minutes at a temperature of 140° C., the activated core splice adhesive according to the invention preferably has a vertical expansion within the range from about 135% to about 195%, more preferably from about 140% to about 190%, still more preferably from about 145% to about 185%, and most preferably from about 150% to about 180%, in each case when being tested in accordance with EN 2667-3.

Core splice adhesives having one or any combination of the aforementioned properties have been formulated and it has been found that admixtures having particular ingredients or features are particularly desirable.

The heat-activatable foamable honeycomb core splice adhesive according to the invention comprises as component a) a curable polymer.

The curable polymer is capable of reacting with component b), i.e. with the curing agent for the curable polymer, wherein reaction typically takes place at the activation temperature and activation to cure temperature, respectively. Thus, the curable polymer typically comprises reactive functional groups that are capable of reacting with compatible reactive functional groups of the curing agent under suitable reaction conditions. Preferably, the reaction of the curable polymer a) with the curing agent b) causes cross-linking thereby rendering the core splice adhesive a thermoset material.

The curable polymer may be a single species or a mixture of two curable polymers that are capable of reacting with the curing agent b). It is also contemplated that the core splice adhesive comprises two curable polymers and two curing agents, wherein a first curable polymer is capable of reacting with a first curing agent, whereas a second curable polymer is capable of reacting with a second curing agent without interference of the two curing reactions.

The curable polymer may include a variety of different polymers, independently of one another selected from the group consisting of functionalized thermoplastics, elastomers, plastomers combinations thereof or the like. For example, and without limitation, polymers that might be appropriately incorporated into the core splice adhesive include halogenated polymers, polycarbonates, polyketones, urethanes, polyesters, silanes, sulfones, allyls, olefins, styrenes, acrylates, methacrylates, epoxies, silicones, phenolics, rubbers, polyphenylene oxides, terephthalates, acetates (e.g., EVA), acrylates, methacrylates (e.g., ethylene methyl acrylate polymer) or mixtures thereof.

Further, curable polymer may include a variety of different polymers, independently of one another selected from the group consisting of functionalized polyolefins (e.g., polyethylene, polypropylene), polystyrenes, polyacrylates, poly(ethylene oxides), poly(ethyleneimines), polyesters, polyurethanes, polysiloxanes, polyethers, polyphosphazines, polyamides, polyimides, polyisobutylenes, polyacrylonitriles, poly(vinyl chlorides), poly(methyl methacrylates), poly(vinyl acetates), poly(vinylidene chlorides), polytetrafluoroethylenes, polyisoprenes, polyacrylamides, polyacrylic acids, and/or polymethacrylates.

The core splice adhesive may comprise up to about 85 wt.-% or greater of curable polymer(s), relative to the total weight of the core splice adhesive. Preferably, the core splice adhesive comprises about 0.1 wt.-% to about 85 wt.-%, more preferably about 1 wt.-% to about 70 wt.-% of curable polymer(s), in each case relative to the total weight of the core splice adhesive.

In a particularly preferred embodiment, the curable polymer a) comprises or essentially consists of an epoxy resin.

Epoxy resin is used herein to mean any of the conventional dimer, oligomer or polymer containing at least one epoxy functional group. The curable polymer may have one or more oxirane rings polymerizable by a ring opening reaction. It is contemplated that the core splice adhesive can include up to about 80 wt.-% of an epoxy resin or more, relative to the total weight of the core splice adhesive. Preferably, the core splice adhesive includes between about 5 wt.-% and about 60 wt.-% epoxy resin and still more preferably between about 10 wt.-% and about 30 wt.-% epoxy resin, in each case relative to the total weight of the core splice adhesive.

The epoxy resin may be aliphatic, cycloaliphatic, aromatic or the like. The epoxy resin may be supplied as a solid (e.g., as pellets, chunks, pieces or the like) or a liquid (e.g., an epoxy resin). The epoxy resin may include an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Preferably, an epoxy resin is added to the core splice adhesive to increase adhesion properties of the core splice adhesive. One exemplary epoxy resin may be a phenolic resin, which may be a novolac type or other type resin. Other preferred epoxy resins containing core splice adhesives may include a bisphenol-A epichlorohydrin ether polymer, or a bisphenol-A epoxy resin which may be modified with butadiene or another polymeric additive.

In some embodiments, the heat-activatable foamable core splice adhesive contains no epoxy resin other than room temperature liquid epoxy resin.

Any suitable room temperature liquid epoxy resin may be used in the core splice adhesive according to the invention. In some embodiments, the liquid epoxy resin is a neat room temperature liquid epoxy resin, i.e., is a liquid at room temperature without addition of solvents or reactive diluents. In some embodiments, the liquid epoxy resin is an epoxy resin mixed with a reactive diluent such that it is a liquid at room temperature, i.e., an epoxy/reactive diluent room temperature liquid epoxy resin. In some embodiments, the core splice adhesive contains no epoxy resin other than room temperature liquid epoxy resin. In some embodiments, the core splice adhesive contains no epoxy resin other than neat room temperature liquid epoxy resin. In some embodiments, the core splice adhesive contains no epoxy resin other than epoxy/reactive diluent room temperature liquid epoxy resin. Suitable room temperature liquid epoxy resins for use as a neat room temperature liquid epoxy resin may include bisphenol-A polyepoxide resins such as EPON 828 (Momentive Specialty Chemicals, Columbus, Ohio); D.E.R 331 (Dow Chemical Company, Midland, Mich.); bisphenol-A/F polyepoxide resins such as EPON 232 (Momentive Specialty Chemicals, Columbus, Ohio). Suitable epoxy/diluent combinations for use as epoxy/reactive diluent room temperature liquid epoxy resin may include epoxy novolac resins such as D.E.N. 438 (Dow Chemical Company, Midland, Mich.) combined with 1,4-cyclohexanedimethanol-diglycidylether; D.E.N. 431, D.E.N. 425 (Dow Chemical Company, Midland, Mich.), Epalloy 9000, Epalloy 8350 (CVC thermoset specialties, Moorestown, N.J.).

Preferably, the curable polymer comprises or essentially consists of a solid reaction product of epichlorohydrin and bisphenol A, an epoxy phenol novolac resin, or a mixture thereof.

In some embodiments, the core splice adhesive comprises at least about 35 wt.-% room temperature liquid epoxy resin, in some embodiments at least about 40 wt.-% room temperature liquid epoxy resin, and in some embodiments at least about 45 wt.-% room temperature liquid epoxy resin, in each case relative to the total weight of the core splice adhesive. In some embodiments, the core splice adhesive comprises not more than about 75 wt.-% room temperature liquid epoxy resin, in some embodiments not more than about 70 wt.-% room temperature liquid epoxy resin, in some embodiments not more than about 65 wt.-% room temperature liquid epoxy resin, in some embodiments not more than about 60 wt.-% room temperature liquid epoxy resin, and in some embodiments not more than about 55 wt.-% room temperature liquid epoxy resin, in each case relative to the total weight of the core splice adhesive.

Preferably, the total content of curable polymer, relative to the total weight of the core splice adhesive, is at least about 7 wt.-%, more preferably at least about 9 wt.-%, still more preferably at least about 11 wt.-%, yet more preferably at least about 13 wt.-%, even more preferably at least about 15 wt.-%, most preferably at least about 17 wt.-%, and in particular at least about 19 wt.-%.

Preferably, the total content of curable polymer, relative to the total weight of the core splice adhesive, is not more than about 56 wt.-%, more preferably not more than about 52 wt.-%, still more preferably not more than about 48 wt.-%, yet more preferably not more than about 44 wt.-%, even more preferably not more than about 40 wt.-%, most preferably not more than about 36 wt.-%, and in particular not more than about 32 wt.-%.

Preferably, the total content of curable polymer, relative to the total weight of the core splice adhesive, is within the range of about 25±19 wt.-%, more preferably about 25±17 wt.-%, still more preferably about 25±15 wt.-%, yet more preferably about 25±13 wt.-%, even more preferably about 25±11 wt.-%, most preferably about 25±9 wt.-%, and in particular about 25±7 wt.-%.

The core splice adhesive according to the present invention, particularly when being designed and devoted for sound reduction (e.g., sound attenuation and or sound absorption), insulation or both, may preferably include a substantial amount of elastomer or rubber, which can be one elastomer or a mixture of several different elastomers. When employed, the content of the elastomer(s) is preferably at least about 5 wt.-%, more preferably at least about 14 wt.-%, even more preferably at least about 25 wt.-% and preferably not more than about 65 wt.-%, more preferably not more than about 45% and even more preferably not more than about 35 wt.-%, in each case relative to the total weight of the core splice adhesive. When the elastomer does not contain functional groups that are capable of reacting with the curing agent, the weight content of the elastomer(s), if contained, does not contribute to the overall weight content of component a), i.e. the curable polymer Suitable rubbers and elastomers include, without limitation, natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene monomer rubbers), chlorosulphonated polyethylene, fluorinated hydrocarbons and the like. Particularly preferred elastomers are EPDMs sold under the tradename VISTALON 7800 and 2504, commercially available from Exxon Mobil Chemical. Another preferred elastomer is a polybutene isobutylene butylenes copolymer sold under the tradename H-1500, commercially available from BP Amoco Chemicals.

In a preferred embodiment, the core splice adhesive according to the invention comprises an anti-sagging agent, which preferably comprises an elastomer, preferably a nitrile rubber.

Preferably, the anti-sagging agent comprises
(i) an elastomer, preferably a nitrile rubber; and/or
(ii) fibers, preferably selected from carbon fibers, glass fibers, and polymer fibers; more preferably aramid fibers; and/or
(iii) clay, preferably sepiolite, smectite, or a combination thereof.

Preferably, the total content of elastomers (e.g. nitrile rubbers, butyl rubbers, bromobutyl rubbers), relative to the total weight of the core splice adhesive, is not more than about 20 wt.-%, more preferably not more than about 15 wt.-%, still more preferably not more than about 10 wt.-%, yet more preferably not more than about 9.0 wt.-%, even more preferably not more than about 8.0 wt.-%, most preferably not more than about 7.0 wt.-%, and in particular not more than about 6.0 wt.-%

In preferred embodiments, the anti-sagging agent comprises
(i) an elastomer in combination with (ii) fibers; or (i) an elastomer in combination with (iii) clay; or (ii) fibers in combination with (iii) clay, or (i) an elastomer in combination with (ii) fibers in combination with (iii) clay.

In preferred embodiments, the anti-sagging agent comprises an elastomer and fibers, wherein the relative weight ratio of the elastomer to the fibers is within the range of about (4.7±4.4):1, more preferably about (4.7±4.0):1, still more preferably about (4.7±3.6):1, yet more preferably about (4.7±3.2):1, even more preferably about (4.7±2.8):1, most preferably about (4.7±2.4):1, and in particular about (4.7±2.0):1.

In preferred embodiments, the anti-sagging agent comprises an elastomer and clay, wherein the relative weight ratio of the elastomer to the clay is within the range of about (3.3±3.0):1 wt.-%, more preferably about (3.3±2.7):1, still more preferably about (3.3±2.4):1, yet more preferably about (3.3±2.1):1, even more preferably about (3.3±1.8):1, most preferably about (3.3±1.5):1, and in particular about (3.3±1.2):1.

Preferably, the total content of anti-sagging agent (i.e. optionally comprising elastomer, fibers and/or clay), relative to the total weight of the core splice adhesive, is at least about 2.5 wt.-%, more preferably at least about 3.0 wt.-%, still more preferably at least about 3.5 wt.-%, yet more preferably at least about 4.0 wt.-%, even more preferably at least about 4.5 wt.-%, most preferably at least about 5.0 wt.-%, and in particular at least about 5.5 wt.-%.

Preferably, the total content of anti-sagging agent (i.e. optionally comprising elastomer, fibers and/or clay), relative to the total weight of the core splice adhesive, is not more than about 23 wt.-%, more preferably not more than about 21 wt.-%, still more preferably not more than about 19 wt.-%, yet more preferably not more than about 16 wt.-%, even more preferably not more than about 13 wt.-%, most preferably not more than about 10 wt.-%, and in particular not more than about 8.5 wt.-%.

Preferably, the total content of anti-sagging agent (i.e. optionally comprising elastomer, fibers and/or clay), relative to the total weight of the core splice adhesive, is within the range of about 7.0±6.3 wt.-%, more preferably about 7.0±5.5 wt.-%, still more preferably about 7.0±4.7 wt.-%, yet more preferably about 7.0±3.9 wt.-%, even more preferably about 7.0±3.1 wt.-%, most preferably about 7.0±2.3 wt.-%, and in particular about 7.0±1.5 wt.-%.

An elastomer-containing adduct can also be employed in the activatable core splice adhesive of the present invention such as an epoxy/elastomer adduct. When the curable polymer comprises an epoxy resin that is capable of reacting with the curing agent, the epoxy/elastomer adduct is typically also capable of reacting with the curing agent. Thus, the weight content of the epoxy/elastomer adduct(s), if contained, contribute to the overall weight content of component a), i.e. the curable polymer.

The elastomer-containing adduct may be included in an amount of up to about 80 wt.-% of the activatable core splice adhesive or more, relative to the total weight of the core splice adhesive. More preferably, the weight content of the elastomer-containing adduct, when included, is about 20 wt.-% to about 80 wt.-%, and more preferably is about 30 wt.-% to about 70 wt.-%, in each case relative to the total weight of the core splice adhesive.

In turn, the elastomer-containing adduct itself preferably is an epoxy/elastomer adduct and includes about 1:5 to 5:1 parts of epoxy resin to elastomer, and more preferably about 1:3 to 3:1 parts of epoxy resin to elastomer.

The elastomer incorporated in the elastomer-containing adduct may be a thermosetting or other elastomer. Exemplary elastomers include, without limitation natural rubber, styrene-butadiene rubber, polyisoprene, polyisobutylene, polybutadiene, isoprene-butadiene copolymer, neoprene, nitrile rubber (e.g., a butyl nitrile, such as carboxy-terminated butyl nitrile), butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chlorosulphonated polyethylene, fluorinated hydrocarbons and the like. In one embodiment, recycled tire rubber is employed.

The elastomer-containing adduct, when added to the activatable core splice adhesive, preferably is added to modify structural properties of the core splice adhesive such as strength, toughness, stiffness, flexural modulus, or the like. Additionally, the elastomer-containing adduct may be selected to render the core splice adhesive more compatible with coatings such as water-borne paint or primer system or other conventional coatings.

In a preferred embodiment, the core splice adhesive according to the invention comprises a tackifier, which preferably comprises or essentially consists of an elastomer-containing adduct as described above.

Preferably, the tackifier comprises or essentially consists of an elastomer modified bisphenol-A-diglycidylether.

Preferably, the tackifier comprises or essentially consists of a carboxyl terminated butadiene acrylonitrile elastomer modified bisphenol-A-diglycidylether, nitrile rubber modified bisphenol-A-diglycidylether, or a mixture thereof.

Preferably, the total content of tackifier, relative to the total weight of the core splice adhesive, is at least about 2 wt.-%, more preferably at least about 4 wt.-%, still more preferably at least about 6 wt.-%, yet more preferably at least about 8 wt.-%, even more preferably at least about 10 wt.-%, most preferably at least about 12 wt.-%, and in particular at least about 14 wt.-%.

Preferably, the total content of tackifier, relative to the total weight of the core splice adhesive, is not more than about 54 wt.-%, more preferably not more than about 50 wt.-%, still more preferably not more than about 46 wt.-%, yet more preferably not more than about 42 wt.-%, even more preferably not more than about 38 wt.-%, most preferably not more than about 34 wt.-%, and in particular not more than about 30 wt.-%.

Preferably, the total content of tackifier, relative to the total weight of the core splice adhesive, is within the range of about 22±20 wt.-%, more preferably about 22±18 wt.-%, still more preferably about 22±16 wt.-%, yet more preferably about 22±14 wt.-%, even more preferably about 22±12 wt.-%, most preferably about 22±10 wt.-%, and in particular about 22±8 wt.-%.

The heat-activatable foamable honeycomb core splice adhesive according to the invention comprises as component b) a curing agent for the curable polymer.

One or more curing agents and/or curing agent accelerators may be added to the activatable core splice adhesive. Amounts of curing agents and curing agent accelerators can, like the blowing agents, vary widely within the core splice adhesive depending upon the type of cellular structure desired, the desired amount of expansion of the core splice adhesive, the desired rate of expansion, the desired structural properties of the core splice adhesive and the like. Exemplary ranges for the curing agents or curing agent accelerators present in the activatable core splice adhesive independently of one another range from about 0.001 wt.-% to about 7 wt.-%, relative to the total weight of the core splice adhesive.

When the core splice adhesive comprises more than a single curing agent and/or more than a single curing agent accelerator, the above weight content preferably refers to the total content of all curing agents and all curing agent accelerators, respectively.

Typically, the curing agents assist the core splice adhesives in curing by crosslinking of the curable polymers such as epoxy resins. It can also be desirable for the curing agents to assist in thermosetting the core splice adhesive.

Preferred curing agents are selected from aliphatic or aromatic amines or their respective adducts, amidoamines, polyamides, cycloaliphatic amines, anhydrides, polycarboxylic polyesters, isocyanates, phenol-based resins (such as phenol or cresol novolac resins, copolymers such as those of phenol terpene, polyvinyl phenol, or bisphenol-A formaldehyde copolymers, bishydroxyphenyl alkanes or the like), sulfur or mixtures thereof. Particularly preferred curing agents include modified and unmodified polyamines or polyamides such as triethylenetetramine, diethylenetriamine tetraethylenepentamine, cyanoguanidine, dicyandiamides and the like.

Any suitable epoxy curing agent may be used. Preferably a heat activated curing agent is used. Suitable epoxy curing agents may include dicyandiamide curing agents; polyamine curing agents, acid anhydride curing agents, guanidine curing agents, mercaptan curing agents and phenol curing agents. Most preferably the epoxy curing agent is a dicyandiamide curing agent.

An accelerator for the curing agents (e.g., a modified or unmodified urea such as methylene diphenyl bis urea, an imidazole or a combination thereof) may also be contained in the core splice adhesive. Other example of curing agent accelerators include, without limitation, metal carbamates (e.g., copper dimethyl dithio carbamate, zinc dibutyl dithio carbamate, combinations thereof or the like), disulfides (e.g., dibenzothiazole disulfide).

In some embodiments, the composition additionally comprises 0.5-10 wt.-% of an epoxy curing accelerator. Any suitable curing accelerator may be used. Suitable curing accelerators may include aromatic substituted ureas; aliphatic and aromatic tertiary amines such as dimethylaminopropylamine; pyridine; boron complexes, including boron complexes with monoethanolamine; and imidazoles such as 2-ethyl-methylimidazole. Most preferably a urea curing accelerator is used.

Though longer curing times are also possible, curing times of not more than 5 minutes, and even not more than 30 seconds are possible. Moreover, such curing times can depend upon whether additional energy (e.g., heat, light, radiation) is applied to the core splice adhesive or whether the core splice adhesive is cured at lower temperature.

As suggested, faster curing agents and/or accelerators can be particularly desirable for shortening the time between onset of cure and substantially full cure (i.e., at least 90% of possible cure for the particular activatable core splice adhesive) and curing the core splice adhesive while it maintains its self supporting characteristics. As used herein, onset of cure is used to mean at least 3% but no greater than 10% of substantially full cure. For the present invention, it is generally desirable for the time between onset of cure and substantially full cure to be not more than about 30 minutes, more preferably not more than about 10 minutes and even more preferably not more than about 5 minutes and still more preferably not more than one minute. It should be noted that more closely correlating the time of softening of the polymeric core splice adhesives, the time of curing and the time of bubble formation or blowing can assist in allowing for activation of the expandable core splice adhesive without substantial loss of its self supporting characteristics. Generally, it is contemplated that experimentation by the skilled artisan can produce desirable cure times using various of the curing agents and/or accelerators discussed above or others. It has been found that for a dicyanamide curing agent or other agents used for cure during activation, other curing agents or accelerators such as a modified polyamine (e.g., cycloaliphatic amine) sold under the tradename ANCAMINE® 2441 or 2442 or 2014 AS; an imidazole (e.g., 4-diamino-6[2'-methylimidazoyl-(1')ethyl-s-triazine isocyanuric] sold under the tradename CUREZOL® 2MA-OK; an amine adduct sold under the tradename PN-23, an adipic hydrazide sold under the tradename ADH all commercially available from Air Products or an adduct of imidazole and isocyanate sold under the tradename LC-65 and commercially available from A & C Catalyst can produce particularly desirable cure times.

The heat-activatable core splice adhesive can be formulated to include a curing agent that at least partially cures the heat-activatable core splice adhesive prior to heat activation of the heat-activatable core splice adhesive. Preferably, the partial cure alone or in combination with other characteristics or ingredients of the heat-activatable core splice adhesive imparts sufficient self supporting characteristics to the heat-activatable core splice adhesive such that, during heat activation and/or foaming, the heat-activatable core splice adhesive expands volumetrically without significantly losing it shape or without significant flow in the direction or gravity.

Preferably, the total content of curing agent for the curable polymer (i.e. optionally also comprising a curing accelerator), relative to the total weight of the core splice adhesive, is at least about 1.2 wt.-%, more preferably at least about 1.5 wt.-%, still more preferably at least about 1.8 wt.-%, yet more preferably at least about 2.1 wt.-%, even more preferably at least about 2.4 wt.-%, most preferably at least about 2.7 wt.-%, and in particular at least about 3.0 wt.-%.

Preferably, the total content of curing agent for the curable polymer (i.e. optionally also comprising a curing accelerator), relative to the total weight of the core splice adhesive, is not more than about 7.7 wt.-%, more preferably not more than about 7.3 wt.-%, still more preferably not more than about 6.9 wt.-%, yet more preferably not more than about 6.5 wt.-%, even more preferably not more than about 6.1 wt.-%, most preferably not more than about 5.7 wt.-%, and in particular not more than about 5.3 wt.-%.

Preferably, the total content of curing agent for the curable polymer (i.e. optionally also comprising a curing accelerator), relative to the total weight of the core splice adhesive, is within the range of about 4.3±3.2 wt.-%, more preferably about 4.3±2.8 wt.-%, still more preferably about 4.3±2.4 wt.-%, yet more preferably about 4.3±2.2 wt.-%, even more preferably about 4.3±1.8 wt.-%, most preferably about 4.3±1.4 wt.-%, and in particular about 4.3±1.0 wt.-%.

In one embodiment, the heat-activatable core splice adhesive includes a first curing agent and, optionally, a first curing agent accelerator, and a second curing agent and, optionally, a second curing agent accelerator, all of which are preferably latent. The first curing agent and/or accelerator are preferably designed to partially cure the heat-activatable core splice adhesive during processing (e.g., processing, mixing, shaping or a combination thereof) of the heat-activatable core splice adhesive for at least assisting in providing the heat-activatable core splice adhesive with the desirable self supporting properties. The second curing agent and/or accelerator will then preferably be latent such that they cure the heat-activatable core splice adhesive upon exposure to elevated temperature (activation to cure temperature).

Generally, it is contemplated that any of the curing agents and/or curing agent accelerators discussed herein or others may be used as the first and second curing agents for the core splice adhesives and the agents or accelerators used will preferably depend upon the desired conditions of partial cure and the desired conditions of activation. However, it has been found that, for the first curing agent, hindered amines such as such as a modified polyamine (e.g., cycloaliphatic amine) sold under the tradename ANCAMINE® 2337 or 2014 commercially available from Air Products, Inc. are particularly useful. Other desirable first curing agents are those that cure the polymeric core splice adhesives at temperatures of mixing, formation and/or shaping (e.g., extrusion, molding or the like) of the core splice adhesive. Thus, curing agents that preferably cure the curable polymer(s) of the core splice adhesives at temperatures of at least about 30° C., but possibly less, more preferably at least about 50° C. and even more preferably at least about 70° C. and/or temperatures not more than about 150° C., more preferably not more than about 120° C. and even more preferably not more than about 100° C.

As one preferred example of this embodiment, the second curing agent and/or accelerator are latent such that one or both of them cure the core splice adhesive by reacting with curable polymer at a second activation temperature or temperature range. However, the first curing agent and/or accelerator are also latent, but either or both of them partially cure the core splice adhesive by reacting with curable polymer upon exposure to a first activation temperature that is below the second activation temperature.

The first activation temperature and partial cure will preferably be experienced during core splice adhesive mixing, shaping or both. For example, the first temperature and partial cure can be experienced in an extruder that is mixing the ingredient of the core splice adhesive and extruding the core splice adhesive through a die into a particular shape. As another example, the first temperature and partial cure can be experienced in a molding machine (e.g., injection molding, blow molding compression molding) that is shaping and, optionally, mixing the ingredients of the core splice adhesive.

The second activation temperature and substantially full cure can then at a temperature be experienced during processing of the article of manufacture to which the activatable core splice adhesive has been applied. Preferably, it is desirable for the core splice adhesive to additionally expand (e.g., foam) as well as cure at the second activation temperature.

Partial cure can be accomplished by a variety of techniques. For example, the first curing agent and/or accelerator may be added to the core splice adhesive in sub-stoichiometric amounts such that the curable polymer of the core splice adhesive provides substantially more reaction sites than are actually reacted by the first curing agent and/or accelerator. Preferred sub-stoichiometric amounts of first curing agent and/or accelerator preferably cause the reaction of no more than about 60%, no more than about 40% or no more than about 30%, about 25% or even about 15% of the available reaction sites provided by the curable polymer of the core splice adhesive. Alternatively, partial cure may be effected by providing a first curing agent and/or accelerator that is only reactive for a percentage of the curable polymers contained in the core splice adhesive such as when multiple different curable polymers are contained in the core splice adhesive and the first curing agent and/or accelerator is only reactive with one or a subset of the curable polymers. In such an embodiment, the first curing agent and/or accelerator is preferably reactive with no more than about 60 wt.-%, no more than about 40 wt.-% or no more than about 30 wt.-%, about 25 wt.-% or even about 15 wt.-% of the total content of all curable polymers that are contained in the core splice adhesives.

In another preferred embodiment, the core splice adhesive may be formed using a two component system that partially cures upon intermixing of the first component with the second component. In such an embodiment, a first component is preferably provided with a first curing agent, a first curing agent accelerator or both and the second component is provided with one or more curable polymers that are cured (e.g., cross-linked) by the curing agent and/or accelerator upon mixing of the first and second component. Such mixing will preferably take place at a temperature below about 80° C. (e.g., around room temperature or from about 10° C. to about 30° C.).

Like the previous embodiments, the partial cure, alone or in combination with other characteristics or ingredients of the core splice adhesive, imparts sufficient self supporting characteristics to the activatable core splice adhesive such that, during activation and/or foaming, the core splice adhesive does not experience substantial flow in the direction of gravity.

Also like the previous embodiments, partial cure, upon mixing may be effected by a variety of techniques. For example, the first curing agent and/or accelerator may, upon mixing of the first component and second component, be present within the activatable core splice adhesive in sub-stoichiometric amounts such that the curable polymer(s) provide substantially more reaction sites than are actually reacted by the first curing agent and/or accelerator. Preferred sub-stoichiometric amounts of first curing agent and/or accelerator preferably cause the reaction of no more than about 60%, no more than about 40% or no more than about 30%, about 25% or even about 15% of the available reaction sites provided by the curable polymer of the core splice adhesive. Alternatively, partial cure may be effected by providing a first curing agent and/or accelerator that is only reactive for a percentage of the curable polymers contained in the core splice adhesive such as when multiple different curable polymers are contained in the core splice adhesive and the first curing agent and/or accelerator is only reactive with one or a subset of the curable polymers. In such an embodiment, the first curing agent and/or accelerator is preferably reactive with no more than about 60 wt.-%, no more than about 40 wt.-% or no more than about 30 wt.-%, about 25 wt.-% or even about 15 wt.-% of the total content of all curable polymers that are contained in the core splice adhesives.

The other ingredients (i.e., additional polymers that are not curable, fillers, other additives, the blowing agents and/or accelerators or the like) of the core splice adhesive may be part of the first or second components of the two component system or may be added separately. Preferably, the other additional ingredients will be split between the components in a manner that allows for reasonably thorough mixing of the first component with the second component. Generally, this will help the core splice adhesive to be substantially homogeneous.

The core splice adhesive formed by the two component system can be shaped according any of the techniques described herein (e.g., extrusion through a die, injection molding or the like). According to one preferred embodiment, however, the first and second components are both provided to and mixed within a die that has one or more cavities that shape the core splice adhesive as it is mixed and/or partially cured.

The heat-activatable foamable honeycomb core splice adhesive according to the invention comprises as component c) a blowing agent.

One or more blowing agents may be contained in the core splice adhesive. Such blowing agents can assist in forming cellular or foamed activated core splice adhesives, which preferably have a lower density and/or weight. In addition, the core splice adhesive expansion that can be caused by the blowing agents can help to improve sealing capability, substrate wetting ability, adhesion to a substrate, acoustic damping, combinations thereof or the like.

The blowing agent may be a physical blowing agent or a chemical blowing agent. For example, the blowing agent may be a physical blowing agent such as a thermoplastic encapsulated gas or liquid that expands upon exposure to a condition such as heat. Alternatively, the blowing agent may chemically react to liberate gas upon exposure to a condition such as heat or humidity or upon exposure to another chemical reactant.

Physical blowing agents are preferred. In a preferred embodiment, the core splice adhesive contains no chemical blowing agent.

Any suitable physical blowing agent may be used in the core splice adhesive according to the invention. In some embodiments, the core splice adhesive contains no blowing agents other than physical blowing agents, so that the resulting thermoexpanded foam is preferably a closed cell foam. Suitable physical blowing agents may include thermoexpandable microcapsules such as those obtainable under the trade designation MICROPEARL® F48D (Lehmann & Voss & Co. KG, Hamburg, Germany); MICROPEARL® F30 (Lehmann & Voss & Co. KG, Hamburg, Germany) or EXPANCEL® (AkzoNobel, Sundsvall, Sweden).

In order to widen the expansion temperature range (activation to foam temperature range) the splice core adhesive according to the invention preferably comprises two physical blowing agents having different activation temperatures.

Preferably, the first physical blowing agent has an activation temperature within the range of from about 105° C. to about 155° C. thereby permitting foaming at comparatively lower temperatures (e.g. Expancel® 051 DU 40, which is composed of expandable plastic microspheres that are commercialized in form of a powder); and the second physical blowing agent has an activation temperature within the range of from about 120° C. to about 200° C. thereby permitting foaming at comparatively higher temperatures (e.g. Expancel® 920 DU 80, which is composed of expandable plastic microspheres that are commercialized in form of a powder).

An accelerator for the blowing agents may also be contained in the core splice adhesive. Various accelerators may be used to increase the rate at which the blowing agents form inert gasses.

Amounts of blowing agents and blowing agent accelerators can vary widely within the core splice adhesive depending upon the type of cellular structure desired, the desired amount of expansion of the expandable core splice adhesive, the desired rate of expansion and the like. Exemplary ranges for the amounts of blowing agents and blowing agent accelerators in the core splice adhesive independently of one another range from about 0.001 wt.-% to about 5 wt.-%.

In some embodiments, the core splice adhesive comprises at least about 0.3 wt.-% physical blowing agent, in some embodiments at least about 0.6 wt.-% physical blowing agent, in some embodiments at least about 1 wt.-% physical blowing agent, in some embodiments at least about 1.5 wt.-% physical blowing agent, and in some embodiments at least about 5 wt.-% physical blowing agent. In some embodiments, the core splice adhesive comprises not more than 8 wt.-% physical blowing agent, in some embodiments not more than 5 wt.-% physical blowing agent, and in some embodiments not more than 2 wt.-% physical blowing agent.

Preferably, the total content of blowing agent (i.e. optionally comprising a first physical blowing agent and a second physical blowing agent), relative to the total weight of the core splice adhesive, is at least about 0.3 wt.-%, more preferably at least about 0.6 wt.-%, still more preferably at least about 0.9 wt.-%, yet more preferably at least about 1.2 wt.-%, even more preferably at least about 1.5 wt.-%, most preferably at least about 1.8 wt.-%, and in particular at least about 2.1 wt.-%.

Preferably, the total content of blowing agent (i.e. optionally comprising a first physical blowing agent and a second physical blowing agent), relative to the total weight of the core splice adhesive, is not more than about 5.1 wt.-%, more preferably not more than about 4.8 wt.-%, still more preferably not more than about 4.5 wt.-%, yet more preferably not more than about 4.2 wt.-%, even more preferably not more than about 3.9 wt.-%, most preferably not more than about 3.3 wt.-%, and in particular not more than about 2.7 wt.-%.

Preferably, the total content of blowing agent (i.e. optionally comprising a first physical blowing agent and a second physical blowing agent), relative to the total weight of the core splice adhesive, is within the range of about 2.5±2.4 wt.-%, more preferably about 2.5±2.1 wt.-%, still more preferably about 2.5±1.8 wt.-%, yet more preferably about 2.5±1.5 wt.-%, even more preferably about 2.5±1.2 wt.-%, most preferably about 2.5±0.9 wt.-%, and in particular about 2.5±0.6 wt.-%.

The heat-activatable foamable honeycomb core splice adhesive according to the invention comprises as component d) a fire retardant (fire retardant/smoke suppressor) comprising a combination of
  (i) an ammonium polyphosphate and
  (ii) a metal hydroxide.

In a preferred embodiment, the relative weight ratio of the ammonium polyphosphate (or when there is more than one ammonium polyphosphate, of the total weight of all ammonium polyphosphates) to the metal hydroxide (or when there is more than one metal hydroxide, of the total weight of all metal hydroxides) is within the range of from about 7:1 to about 1:7, more preferably about 6:1 to about 1:6, still more preferably about 5:1 to about 1:5, yet more preferably about 4:1 to about 1:4, even more preferably about 3:1 to about 1:3, most preferably about 2:1 to about 1:2, and in particular about 1.5:1 to about 1:1.5.

In another preferred embodiment, the relative weight ratio of the ammonium polyphosphate (or when there is more than one ammonium polyphosphate, of the total weight of all ammonium polyphosphates) to the metal hydroxide (or when there is more than one metal hydroxide, of the total weight of all metal hydroxides) is within the range of from about 5:1 to about 1.1:1, or about 4:1 to about 1.1:1, or about 3:1 to about 1.1:1, or about 2:1 to about 1.1:1, or about 1.5:1 to about 1.1:1.

In still another preferred embodiment, the relative weight ratio of the metal hydroxide (or when there is more than one metal hydroxide, of the total weight of all metal hydroxides) to the ammonium polyphosphate (or when there is more than one ammonium polyphosphate, of the total weight of all ammonium polyphosphates) is within the range of from about 5:1 to about 1.1:1, or about 4:1 to about 1.1:1, or about 3:1 to about 1.1:1, or about 2:1 to about 1.1:1, or about 1.5:1 to about 1.1:1.

It has been surprisingly found that the inventive combination provides improved fire retardancy and improved smoke properties, especially in terms of smoke density and smoke toxicity.

Preferably, the total content of fire retardants and/or smoke suppressors, preferably being independently from one another selected from ammonium polyphosphates, metal hydroxides, and expandable graphites, is not more than about 60 wt.-%, more preferably not more than about 50 wt.-%, still more preferably not more than about 45 wt.-%, yet more preferably not more than about 40 wt.-%, even more preferably not more than about 35 wt.-%, most preferably not more than about 30 wt.-%, and in particular not more than about 25 wt.-%, in each case relative to the total weight of the core splice adhesive.

The ammonium polyphosphate, which is preferably employed and commercially available in form of a powder, preferably acts as a flame retardant, whereas the metal hydroxide, which is preferably also employed and commercially available in form of a powder, preferably acts as a flame retardant as well as a smoke suppressor.

Preferably, the core splice adhesive according to the invention does not contain heat expandable graphite (HEG).

In some embodiments, the core splice adhesive comprises neither an intumescent graphite flame retardant nor a red phosphorus flame retardant nor zinc borate. Red phosphorous is fatal if swallowed or inhaled, causes severe skin burns and eye damage and catches fire spontaneously if exposed to air. Zinc borate is suspected of damaging fertility or the unborn child.

In a particularly preferred embodiment, component d) of the heat-activatable foamable honeycomb core splice adhesive according to the invention comprises or essentially consists of a combination of an ammonium polyphosphate oligomer (e.g. Aflammit® PCI 202 or Aflammit® PCI 203) with aluminum trihydroxide (e.g. ATH SH 30, ATH SH 100).

Without wishing to be bound to any scientific theory, it is assumed that when being exposed to fire,
(i) the ammonium polyphosphate
    possibly influences the smoke toxicity by radical quenching;
    decreases the smoke density (smoke opacity) by dilution of flammable gases;
    forms a barrier layer on the solid phase; and
    cools the gas phase as well as the solid phase by release of water
(ii) the metal hydroxide, preferably aluminum trihydroxide,
    decreases the smoke density (smoke opacity) by dilution of flammable gases;
    reinforces the barrier layer that is formed by the ammonium polyphosphate; and
    cools the gas phase as well as the solid phase by release of water.

While the ammonium polyphosphate provides particularly good flame resistance, has a good influence on smoke density (smoke opacity), and has a good influence on smoke toxicity at an advantageous weight content within the core splice adhesive, the metal hydroxide provides excellent flame resistance, has a very good influence on smoke density (smoke opacity), and has an excellent influence on smoke toxicity at a comparatively high weight content within the core splice adhesive. The ammonium polyphosphate has the disadvantage of a comparatively high price, whereas the metal hydroxide has the disadvantage of a comparatively high density. It has been surprisingly found that the above advantages and disadvantages can be well balanced thereby providing core splice adhesives providing excellent performance at reasonable weight and costs.

Preferred metal hydroxides include aluminum trihydroxide, magnesium hydroxide, and mixtures thereof.

Preferably, the ammonium polyphosphate
    has an average molecular weight, preferably a weight average molecular weight $M_w$, within the range of from about 500 g/mol to about 5000 g/mol, or about 1000 g/mol to about 3500 g/mol, or about 1500 g/mol to about 3000 g/mol; and/or
    has a phosphorous content of at least about 15%, or at least about 20%, or at least about 25%, or at least about 30%; and/or
    has a nitrogen content of at least about 4%, or at least about 7%, or at least about 10%, or at least about 13%.

The ammonium polyphosphate may or may not be encapsulated.

Suitable non encapsulated ammonium polyphosphates can be readily available commercially, under the trade name Exolit® AP-422 from Clariant, FR Cros® 484 from Budenheim, Antiblaze® LR3 from Albemarle, APP1001 from Dgtech International and Aflammit® PCI-202 or Aflammit® PCI 203 from Thor.

In a preferred embodiment, the ammonium polyphosphate is encapsulated. Suitable encapsulated ammonium polyphosphates are described in U.S. Pat. Nos. 4,347,334, 4,467,056, 4,514,328, and 4,639,331 hereby incorporated by reference. Such encapsulated ammonium polyphosphates contain a hardened, water insoluble resin enveloping the individual ammonium polyphosphate particles. The resin may be a phenol-formaldehyde resin, an epoxy resin, a surface reacted silane, a surface reacted melamine or a melamine-formaldehyde resin. As an example for use is the encapsulated ammonium polyphosphate flame retardant available under the trademark FR CROS® C 60, FR CROS® C30, FR CROS® C70 from Chemische Fabrik Budenheim, Budenheim am Rhein, Germany, Exolit® 462 from Clariant. For example, the encapsulated ammonium polyphosphate flame retardant can be a melamine-formaldehyde encapsulated ammonium polyphosphate additive.

Preferably, the total content of ammonium polyphosphate, relative to the total weight of the core splice adhesive, is at least about 6 wt.-%, more preferably at least about 8 wt.-%, still more preferably at least about 10 wt.-%, yet more preferably at least about 12 wt.-%, even more preferably at least about 14 wt.-%, most preferably at least about 16 wt.-%, and in particular at least about 18 wt.-%.

Preferably, the total content of ammonium polyphosphate, relative to the total weight of the core splice adhesive, is not more than about 43 wt.-%, more preferably not more than about 39 wt.-%, still more preferably not more than about 35 wt.-%, yet more preferably not more than about 31 wt.-%, even more preferably not more than about 27 wt.-%, most preferably not more than about 23 wt.-%, and in particular not more than about 19 wt.-%.

Preferably the total content of ammonium polyphosphate, relative to the total weight of the core splice adhesive, is within the range of about 18.5±14 wt.-%, more preferably about 18.5±12 wt.-%, still more preferably about 18.5±10 wt.-%, yet more preferably about 18.5±8 wt.-%, even more preferably about 18.5±6 wt.-%, most preferably about 18.5±4 wt.-%, and in particular about 18.5±2 wt.-%.

Preferably, the total content of metal hydroxide, relative to the total weight of the core splice adhesive, is at least about 7 wt.-%, more preferably at least about 9 wt.-%, still more preferably at least about 11 wt.-%, yet more preferably at least about 13 wt.-%, even more preferably at least about 15 wt.-%, most preferably at least about 17 wt.-%, and in particular at least about 19 wt.-%.

Preferably, the total content of metal hydroxide, relative to the total weight of the core splice adhesive, is not more than about 45 wt.-%, more preferably not more than about 41 wt.-%, still more preferably not more than about 37 wt.-%, yet more preferably not more than about 33 wt.-%, even more preferably not more than about 29 wt.-%, most preferably not more than about 25 wt.-%, and in particular not more than about 21 wt.-%.

Preferably, the total content of metal hydroxide, relative to the total weight of the core splice adhesive, is within the range of about 20±14 wt.-%, more preferably about 20±12 wt.-%, still more preferably about 20±10 wt.-%, yet more preferably about 20±8 wt.-%, even more preferably about 20±6 wt.-%, most preferably about 20±14 wt.-%, and in particular about 20±4 wt.-%.

The fire retardant (component d), i.e. the combination of ammonium polyphosphate and metal hydroxide) can be a fairly substantial weight percentage of the core splice adhesive. Preferably, the total weight content of the fire retardant (weight content of ammonium polyphosphate plus weight content of metal hydroxide) is at least about 2 wt.-%, more preferably at least about 12 wt.-%, even more preferably at least about 25 wt.-% and even possibly at least about 35 wt.-%, in each case relative to the total weight of the core splice adhesive. In a preferred embodiment, the total weight content of the fire retardant (weight content of ammonium polyphosphate plus weight content of metal hydroxide) is within the range of from about 40 wt.-% to about 75 wt.-%, more preferably from about 40 wt.-% to about 60 wt.-%, in each case relative to the total weight of the core splice adhesive.

In some embodiments, the core splice adhesive comprises at least about 5 wt.-% flame retardant, in some embodiments at least about 10 wt.-% flame retardant, and in some embodiments at least about 15 wt.-% flame retardant, in each case relative to the total weight of the core splice adhesive. In some embodiments, the core splice adhesive comprises not more than 20 wt.-% flame retardant, relative to the total weight of the core splice adhesive.

It is preferred that component d), i.e. the fire retardant, be halogen free. Gases formed during combustion of halogen-containing fire retardants are very toxic.

The heat-activatable foamable honeycomb core splice adhesive according to the invention may optionally also comprise as component e) a thermoplastic resin.

Any suitable thermoplastic resin may be used in the core splice adhesive according to the invention. Preferably, the thermoplastic resin has a softening point of between 60° C. and 150° C., as measured by DIN EN ISO 306 method A50. In some embodiments, the thermoplastic resin has a softening point of not more than 150° C., in some embodiments not more than 135° C., in some embodiments not more than 120° C., in some embodiments not more than 105° C., and in some embodiments not more than 95° C. In some embodiments, the thermoplastic resin has a softening point of at least about 60° C., in some embodiments at least about 70° C., and in some embodiments at least about 80° C. Preferably, the thermoplastic resin is a polymer comprising phenylene oxide (-Ph-O—) units in its polymer backbone. In some embodiments, the thermoplastic resin is a phenoxy resin. In some embodiments, the thermoplastic resin is a copolymer of bisphenol A and epichlorohydrin. In some embodiments the thermoplastic resin is a polyethersulfone.

In some embodiments, the core splice adhesive comprises at least about 10 wt.-% thermoplastic resin, in some embodiments at least about 16 wt.-% thermoplastic resin, and in some embodiments at least about 18 wt.-% thermoplastic resin, in each case relative to the total weight of the core splice adhesive. In some embodiments, the core splice adhesive comprises not more than 35 wt.-% thermoplastic resin, in some embodiments not more than 30 wt.-% thermoplastic resin, and in some embodiments not more than 25 wt.-% thermoplastic resin, in each case relative to the total weight of the core splice adhesive.

The heat-activatable foamable honeycomb core splice adhesive according to the invention may also include one or more fillers, including but not limited to particulated materials (e.g., powder), beads, microspheres, or the like. Preferably, the filler includes a relatively low-density material that is generally non-reactive with the other components present in the activatable core splice adhesive.

Examples of fillers include silica, diatomaceous earth, glass, clay, talc, pigments, glass beads or bubbles, glass, carbon ceramic fibers, and the like. Such fillers, particularly clays, can assist the activatable core splice adhesive in leveling itself during flow of the core splice adhesive. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, silicate minerals and mica in particular improve the impact resistance of the cured core splice adhesive.

When employed, the content of the fillers in the core splice adhesive can range from about 10 wt.-% to 90 about wt.-%, relative to the total weight of the core splice adhesive. According to some embodiments, the core splice adhesive may include from about 0.001 wt.-% to about 30 wt.-%, and more preferably about 10 wt.-% to about 20 wt.-% clays or similar fillers, in each case relative to the total weight of the core splice adhesive. Powdered (e.g. about 0.01 to about 50, and more preferably about 1 to 25 micron mean particle diameter) mineral type filler can comprise between about 5 wt.-% and 70 wt.-%, more preferably about 10 wt.-% to about 20 wt.-%, and still more preferably approximately 13 wt.-%, relative to the total weight of the core splice adhesive.

It is contemplated that one of the fillers or other components of the core splice adhesive may be thixotropic for assisting in controlling flow of the core splice adhesive as well as properties such as tensile, compressive or shear strength. Such thixotropic fillers can additionally provide self supporting characteristics to the core splice adhesive. Examples of thixotropic fillers include, without limitation, silica, calcium carbonate, clays, aramid fiber or pulp or others. One preferred thixotropic filler is synthetic amorphous precipitated silicon dioxide.

Other additives, agents or performance modifiers may also be included in the heat-activatable foamable honeycomb core splice adhesive according to the invention as desired, including but not limited to UV resistant agents, impact modifiers, heat stabilizers, UV photoinitiators, colorants, processing aids, lubricants, and reinforcements (e.g., chopped or continuous glass, ceramic, aramid, or carbon fiber or the like).

In some embodiments, the core splice adhesive additionally comprises one or more pigments.

In some embodiments, the core splice adhesive additionally comprises one or more toughening agents.

In some embodiments, the core splice adhesive additionally comprises one or more rheology modifiers.

In some embodiments, the core splice adhesive additionally comprises one or more mineral particles. In some embodiments, the mineral particles are alumina. In some embodiments, the mineral particles are silica. In some embodiments, the mineral particles are calcite.

In some embodiments, the core splice adhesive additionally comprises one or more hollow microspheres. In some embodiments, the hollow microspheres are glass. In some embodiments, the hollow microspheres are polymeric.

In some embodiments, the composition additionally comprises one or more fibers.

In particularly preferred embodiments of the core splice adhesive according to the invention
  the total content of ammonium polyphosphate, relative to the total weight of the core splice adhesive, is not more than about 31 wt.-%, more preferably not more than about 30 wt.-%, still more preferably not more than about 29 wt.-%, yet more preferably not more than about 28 wt.-%, even more preferably not more than about 27 wt.-%, most preferably not more than about 26 wt.-%, and in particular not more than about 25 wt.-%; and/or
  the total content of metal hydroxide, relative to the total weight of the core splice adhesive, is at least about 14 wt.-%, more preferably at least about 15 wt.-%, still more preferably at least about 16 wt.-%, yet more preferably at least about 17 wt.-%, even more preferably at least about 18 wt.-%, most preferably at least about 19 wt.-%, and in particular at least about 20 wt.-%; and/or
  the total content of elastomers, relative to the total weight of the core splice adhesive, is not more than about 12 wt.-%, more preferably not more than about 11 wt.-%, still more preferably not more than about 10 wt.-%, yet more preferably not more than about 9.0 wt.-%, even more preferably not more than about 8.0 wt.-%, most preferably not more than about 7.0 wt.-%, and in particular not more than about 6.0 wt.-%; and/or
  the core splice adhesive does not contain expandable graphite.

Another aspect of the invention relates to the use of the heat-activatable foamable honeycomb core splice adhesive according to the invention as described above for assembling honeycomb structures, preferably for the bonding together of honeycomb structures and/or for edge finishing of honeycomb structures.

Another aspect of the invention relates to a method for assembling honeycomb structures, preferably for the bonding together of honeycomb structures and/or for edge finishing of honeycomb structures, comprising the steps of (a) applying a heat-activatable foamable honeycomb core splice adhesive according to the invention as described herein to a honeycomb panel structure; and
(b) heat-activating the core splice adhesive.

It is contemplated that the honeycomb panel structure may be derived from a variety of articles. Exemplary articles include household or industrial appliance (e.g., dishwashers, washing machines, dryers or the like), furniture, storage containers or the like. In one embodiment, the honeycomb panel structure is employed in a transportation vehicle (e.g., an automotive vehicle, a boat, an airplane or the like). When used for a transportation vehicle, the panel structure has been found to be particularly useful panel structure of an aerospace vehicle (e.g., an airplane). As such, the panel structure of the present invention is primarily discussed in relation to an airplane, however, the invention should not be so limited unless otherwise stated.

The facing sheet of the honeycomb panel structure may be formed of a variety of materials. Exemplary materials include metals, polymeric materials (e.g., plastics, elastomers, thermoplastics, thermosets, combinations thereof or the like). The materials of the honeycomb panels may also be reinforced with minerals, fibrous materials (e.g., glass, carbon or nylon fibers), combinations thereof or the like. In one embodiment, one facing sheet is formed of fiberglass/plastic composite and another is formed of a metal or metal alloy.

The present invention provides a film of the heat-activatable foamable core splice adhesive as described above. In some embodiments, the core splice adhesive is in the form of a film. In some embodiments, the core splice adhesive is in the form of a tape. Preferably such a film or tape has a thickness of at least about 0.01 mm, more preferably at least about 0.1 mm, and more preferably at least about 0.5 mm. Preferably such a film or tape has a thickness of not more than 20 mm, more preferably not more than 10 mm, and more preferably not more than 5 mm.

In another aspect, the present invention provides a cured composition obtained by curing the heat-activatable foamable core splice adhesive as described above.

Another aspect of the invention relates to a honeycomb structure comprising the heat-activatable foamable honeycomb core splice adhesive according to the invention as described, either prior to heat-activation and prior to foaming, or in its heat activated and foamed state.

The core splice adhesive according to the invention may be made by any suitable method. In one method, less thermally sensitive components are first combined at elevated temperatures, such as the liquid epoxy resin, thermoplastic resin, toughening agents, fillers, pigments, and flame retardants. The temperature is then reduced and more thermally sensitive components are added, such as curing agents, accelerators, and blowing agents. In some embodiments, the composition is then formed into a film.

The following examples further illustrate the invention but are not to be construed as limiting its scope.

The following commercial ingredients were employed in the preparation of the exemplified formulations:

| | |
|---|---|
| Twaron ® fibers | para-aramid fibers |
| Nipol ® DN 3335 | acrylonitrile/butadiene rubber |
| Garamite ® 1958 | sepiolite and smectite clays |
| DER ® 671 | solid epoxy resin, low molecular weight solid reaction product of epichlorohydrin and bisphenol A |

-continued

| Araldite ® EPN 9850 | low-viscosity epoxy phenol novolac resin |
| Aflammit ® PCI 203 | ammonium polyphosphate (APP, phase II) (31% P, 14% N) |
| Aflammit ® PMN 500 | melamine |
| ATH SH30 | aluminum trihydroxide |
| Struktol ® Polydis 3695 | 10-15% nitrile rubber (NBR) modified DGEBA |
| Hypox ® RA1340 | 25%-50% carboxyl terminated butadiene acrylonitrile (CTBN) elastomer modified DGEBA |
| Dyhard ® 100S | micronized dicyandiamide |
| Dyhard ® UR 400 | latent micronized urone accelerator based on substituted urea |
| Expancel ® 051 DU 40 | spherically formed particles with a thermoplastic shell encapsulating a gas |
| Bayferrox ® 600 | light brown iron oxide pigment |

EXAMPLE 1

The following two core splice adhesives were prepared:

| Function | Ingredient | Comparative Example 1 wt.-% | Inventive Example 1 wt.-% |
|---|---|---|---|
| Anti-sagging agent | NIPOL ® DN 3335 | 5.70 | 5.70 |
| Epoxy resin | DER ® 671 | 19.96 | 19.96 |
| Flame retardant/ smoke suppressor | Aflammit ® PMN 500 | 20.53 | — |
| | Aflammit ® PCI 203 | 18.25 | 18.25 |
| | ATH SH30 | — | 20.53 |
| Tackifier | Hypox ® RA1340 | 29.65 | 29.65 |
| Curing agent/ curing accelerator | Dyhard ® 100S | 1.14 | 1.14 |
| | Dyhard ® UR 400 | 2.17 | 2.17 |
| Blowing agent | Expancel ® 051 DU 40 | 2.57 | 2.57 |
| Coloring pigment | Bayferrox ® 600 | 0.03 | 0.03 |
| | Total | 100.00 | 100.00 |

Compared to Comparative Example 1, the formulation of Inventive Example 1 gives half the smoke density and smoke toxicity.

EXAMPLE 2

The following two core splice adhesives were prepared:

| Function | Ingredient | Inventive Example 2 wt.-% | Inventive Example 3 wt.-% |
|---|---|---|---|
| Anti-sagging agent | Twaron ® fibers | — | 1.12 |
| | Nipol ® DN 3335 | 5.62 | 5.62 |
| | Garamite ® 1958 | — | 1.69 |
| Epoxy resin | DER ® 671 | 19.66 | 19.66 |
| | Araldite ® EPN 9850 | — | 11.91 |
| Flame retardant/ smoke suppressor | Aflammit ® PCI 203 | 18.56 | 18.56 |
| | ATH SH30 | 19.36 | 19.36 |
| Tackifier | Struktol ® Polydis 3695 | — | 14.49 |
| | Hypox ® RA1340 | 29.21 | — |
| Curing agent/ curing accelerator | Dyhard ® 100S | 3.15 | 3.15 |
| | Dyhard ® UR 400 | 2.10 | 2.10 |
| Blowing agent | Expancel ® 051 DU 40 | 2.30 | 2.30 |
| Coloring pigment | Bayferrox ® 600 | 0.03 | 0.03 |
| | Total | 100.00 | 100.00 |

Compared to Inventive Example 2, the formulation of Inventive Example 3 had an even higher tack when uncured and a low flow during curing. The maximum tack force measured in accordance with ASTM D 2979 for inventive Example 3 was within the range of from 14-24 Newton, whereas that maximum tack force for inventive Example 2 was within the range of from 3-7 Newton.

As demonstrated by the above experimental data, the core splice adhesives according to the invention have excellent mechanical properties and improved flame retardancy, especially in terms of smoke density and smoke toxicity.

The invention claimed is:

1. A heat-activatable foamable adhesive comprising
   a) a curable polymer;
   b) a curing agent for the curable polymer;
   c) a blowing agent; and
   d) a fire retardant comprising a combination of
      (i) an ammonium polyphosphate
      (ii) a metal hydroxide; and
   e) an anti-sagging agent comprising:
      (i) an elastomer comprising a nitrile rubber and/or
      (ii) fibers comprising aramid fibers and/or
      (iii) clay comprising sepiolite, smectite, or a combination thereof:
   wherein the fire retardant does not contain expandable graphite.

2. The adhesive according to claim 1, wherein the ammonium polyphosphate has an average molecular weight within the range of from about 500 g/mol to about 5000 g/mol.

3. The adhesive according to claim 2, wherein the metal hydroxide is aluminum trihydroxide.

4. The adhesive according to claim 1, wherein the ammonium polyphosphate (i) has a phosphorous content of at least about 15.

5. The adhesive according to claim 4, wherein the total content of fire retardants and smoke suppressors, being independent from one another, is selected from ammonium polyphosphates and/or metal hydroxides, is not more than 25 wt.-%, in each case relative to the total weight of the adhesive.

6. The adhesive according to claim 1, which provides a smoke density of not more than about 200 at a sample thickness of 6.35 mm and after a curing cycle under curing conditions comprising (i) an initial dynamic heating period from room temperature to a temperature of 125° C. at a heating rate of 3° C./min and (ii) a subsequent constant heating period of 55 minutes at a temperature of 125° C., in accordance with JAR/FAR 25.853 AITM 2.0007 A flaming modes.

7. The adhesive according to claim 6, which provides a smoke toxicity, with respect to (i) HF: of not more than about 60 ppm; and/or (ii) HCl: of not more than about 60 ppm; and/or (iii) NOx: of not more than about 100 ppm; and/or (iv) SO2: of not more than about 70 ppm; and/or (v) HCN: of not more than about 90 ppm; in each case at the sample thickness of 6.35 mm and after the curing cycle under curing conditions comprising (i) the initial dynamic heating period from room temperature to the temperature of 125° C. at a heating rate of 3° C./min and (ii) the subsequent constant heating period of 55 minutes at the temperature of 125° C., in accordance with AITM 3.0005.

8. The adhesive according to claim 1, which
   (i) comprises a tackifier; and/or
   (ii) which prior to heat activation is tacky, wherein maximum tack force is measured in accordance with ASTM D 297 is at least about 2.5 Newton.

9. The adhesive according to claim 8, wherein the tackifier comprises an elastomer modified bisphenol-A-diglycidylether, wherein the elastomer is selected from the group consisting of natural rubber, styrene-butadiene rubber, polyisoprene, polyisobutylene, polybutadiene, isoprene-butadiene copolymer, neoprene, nitrile rubber, butyl rubber, polysulfide elastomer, acrylic elastomer, acrylonitrile elastomers, silicone rubber, polysiloxanes, polyester rubber, diisocyanate-linked condensation elastomer, EPDM (ethylene-propylene diene rubbers), chloro-sulphonated polyethylene, and fluorinated hydrocarbons.

10. The adhesive according to claim 9, wherein the total content of elastomers, relative to the total weight of the adhesive, is not more than 6.0 wt.-%.

11. The adhesive according to claim 8, wherein the tackifier comprises a carboxyl terminated butadiene acrylonitrile elastomer modified bisphenol-A-diglycidylether, nitrile rubber modified bisphenol-A-diglycidylether, or a mixture thereof.

12. The adhesive according to claim 1, wherein the relative weight ratio of the elastomer to the fibers is within the range of (4.7±2.0):1.

13. The adhesive according to claim 1, wherein the total content of anti-sagging agent, relative to the total weight of the adhesive, is at least 5.5 wt.-%.

14. The adhesive according to claim 1, wherein the blowing agent comprises a first physical blowing agent and a second physical blowing agent.

15. The adhesive according to claim 14, wherein the first physical blowing agent has an activation temperature within the range of 105° C. to 155° C. and wherein the second physical blowing agent has an activation temperature within the range of 120° C. to 200° C.

16. The adhesive according to claim 1, wherein the curable polymer comprises an epoxy resin.

17. The adhesive according to claim 16, wherein the curable polymer comprises a solid reaction product of epichlorohydrin and bisphenol A, an epoxy phenol novolac resin, or a mixture thereof.

18. The adhesive according to claim 1, wherein the total content of curable polymer, relative to the total weight of the adhesive, is at least about 7 wt.-%.

19. The adhesive according to claim 1 which demonstrates volume expansion upon cure of at least about 250%.

20. A method for assembling honeycomb structures, for the bonding together of honeycomb structures and/or for edge finishing of honeycomb structures, comprising the steps of (a) applying a heat-activatable foamable honeycomb adhesive according to claim 1 to a honeycomb panel structure; and (b) heat-activating the adhesive.

* * * * *